US012110577B2

(12) United States Patent
Watanabe et al.

(10) Patent No.: US 12,110,577 B2
(45) Date of Patent: Oct. 8, 2024

(54) DUST CORE

(71) Applicant: NGK SPARK PLUG CO., LTD., Nagoya (JP)

(72) Inventors: Hiroshi Watanabe, Nagoya (JP); Satoshi Mori, Nagoya (JP); Manami Fujii, Nagoya (JP); Katsuya Takaoka, Nagoya (JP); Hiroki Takeuchi, Nagoya (JP); Hisashi Kozuka, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 534 days.

(21) Appl. No.: 17/421,201

(22) PCT Filed: Mar. 11, 2020

(86) PCT No.: PCT/JP2020/010572
§ 371 (c)(1),
(2) Date: Jul. 7, 2021

(87) PCT Pub. No.: WO2020/195842
PCT Pub. Date: Oct. 1, 2020

(65) Prior Publication Data

US 2022/0059263 A1 Feb. 24, 2022

(30) Foreign Application Priority Data

Mar. 22, 2019 (JP) ................................. 2019-054183

(51) Int. Cl.
*B22F 1/00* (2022.01)
*B22F 1/05* (2022.01)
(Continued)

(52) U.S. Cl.
CPC ................ *C22C 38/02* (2013.01); *B22F 1/00* (2013.01); *B22F 1/05* (2022.01); *B22F 1/052* (2022.01);
(Continued)

(58) Field of Classification Search
CPC .... B22F 1/00; B22F 1/05; B22F 1/052; B22F 1/105; B22F 1/16; B22F 3/03;
(Continued)

(56) References Cited

U.S. PATENT DOCUMENTS

2013/0056674 A1 3/2013 Inagaki et al.
2016/0071636 A1* 3/2016 Ohtsubo .................. H01F 1/26 148/307
2018/0137959 A1* 5/2018 Saigusa ............... H01F 41/0246

FOREIGN PATENT DOCUMENTS

EP 1912225 A1 4/2008
EP 2 105 936 A1 9/2009
(Continued)

OTHER PUBLICATIONS

Japan Patent Office, International Search Report issued in corresponding Application No. PCT/JP2020/010572, mailed Jun. 9, 2020.

(Continued)

*Primary Examiner* — Kevin C T Li

(74) *Attorney, Agent, or Firm* — Stites & Harbison, PLLC; Jeffrey A. Haeberlin; Trevor T. Graves

(57) ABSTRACT

The iron loss of a dust core is reduced. A dust core (1) includes soft magnetic metal particles (3) having an average particle size of 5 μm or more and 30 μm or less, and a particle boundary phase (6). The particle boundary phase (6) includes a polycrystalline compound containing Al (aluminum). When a sectional structure of the dust core (1) is observed, an area percentage of $\alpha$-$Al_2O_3$ in the particle boundary phase (6) is 75% or less. An average thickness Ta of the particle boundary phase (6) is 10 nm or more and 300 nm or less. According to the present invention, the iron loss is reduced.

5 Claims, 7 Drawing Sheets

(51) Int. Cl.
*B22F 1/052* (2022.01)
*B22F 1/105* (2022.01)
*B22F 1/16* (2022.01)
*C22C 38/02* (2006.01)
*H01F 1/20* (2006.01)

(52) U.S. Cl.
CPC ................ *B22F 1/105* (2022.01); *B22F 1/16* (2022.01); *H01F 1/20* (2013.01); *B22F 2301/35* (2013.01); *B22F 2302/253* (2013.01); *B22F 2304/10* (2013.01)

(58) Field of Classification Search
CPC ............ B22F 2003/248; B22F 2301/35; B22F 2302/253; B22F 2304/10; B22F 2998/10; C22C 38/00; C22C 38/02; C22C 38/18; C22C 2200/02; C22C 2202/02; H01F 1/20; H01F 1/24
See application file for complete search history.

(56) References Cited

FOREIGN PATENT DOCUMENTS

| | | | |
|---|---|---|---|
| EP | 2 993 672 | A1 | 3/2016 |
| JP | 2005-294458 | A | 10/2005 |
| JP | 2018-82014 | A | 5/2018 |

OTHER PUBLICATIONS

European Patent Office, Extended European Search Report issued in corresponding Application No. EP 20 78 0068, dated Aug. 16, 2022.

* cited by examiner

DUST CORE

TECHNICAL FIELD

The present invention relates to a dust core.

BACKGROUND ART

Dust cores have been actively developed from the viewpoint of high flexibility in shape and the possibility of application to a high-frequency band.

Patent Literature 1 discloses a dust core for high frequencies. The dust core is produced by using a composite magnetic material powder prepared by uniformly mixing and dispersing a crystalline magnetic material and an amorphous magnetic material, and using, as an insulating material, an organic polymer resin such as a silicone resin, a phenolic resin, or an epoxy resin, or water glass.

CITATION LIST

Patent Literature

PTL 1: Japanese Unexamined Patent Application Publication No. 2005-294458

SUMMARY OF INVENTION

Technical Problem

However, the iron loss of the above dust core is not necessarily reduced sufficiently, and a further reduction in the iron loss has been desired.

The present invention has been made in view of the circumstances described above, and an object of the present invention is to further reduce the iron loss. The present invention can be realized as embodiments described below.

Solution to Problem

[1] A dust core including soft magnetic metal particles and a particle boundary phase, the soft magnetic metal particles having an average particle size of 5 μm or more and 30 μm or less, in which the particle boundary phase includes a polycrystalline compound containing Al (aluminum), when a sectional structure of the dust core is observed, an area percentage of $\alpha$-$Al_2O_3$ in the particle boundary phase is 75% or less, when the sectional structure of the dust core is observed in a first field of view of a 150 μm×150 μm square, and when, in a region where the particle boundary phase is located in an H-letter shape, two intersecting points where two vertical lines and one horizontal line that constitute the H letter intersect are connected with a straight line, and a perpendicular bisector of the straight line is drawn, a crossing width at a position where the perpendicular bisector crosses the particle boundary phase is defined as a thickness Tn of the particle boundary phase, and when the thickness of the particle boundary phase is measured at five positions to respectively determine Tn (where n is an integer of 1 to 5), and an average thickness Ta which is an average of Tn (where n is an integer of 1 to 5) is calculated, the average thickness Ta is 10 nm or more and 300 nm or less.

[2] The dust core according to [1], in which when a ratio of an amount of Al to an amount of oxygen in the particle boundary phase is measured, Al:O (molar ratio) is 2.0:2.5 to 2.0:2.9.

[3] The dust core according to [1] or [2], in which when the sectional structure of the dust core is observed in a second field of view of a 100 μm×100 μm square, the particle boundary phase is continuously formed from a start point at which the particle boundary phase is present on one side of the square defining the second field of view to a side opposing the one side of the square, and the dust core has five or more continuous layers that are different from each other, and an average length of paths of the continuous layers from the one side to the opposing side is 115 μm or more.

[4] The dust core according to any one of [1] to [3], in which when the sectional structure of the dust core is observed in a third field of view of a 100 μm×100 μm square, and an area percentage P (%) of pores in the third field of view is determined, a difference between P1 and P2 is 3% or less, where P1 represents a maximum value of the area percentage P, and P2 represents a minimum value of the area percentage P.

[5] The dust core according to any one of [1] to [4], in which when the sectional structure of the dust core is observed, an area percentage S(Al) of the polycrystalline compound containing Al (aluminum) in the particle boundary phase is 85% or more and 100% or less, and when, in the area percentage S(Al), an area percentage S($\alpha$) of $\alpha$-$Al_2O_3$ is represented by A %, an area percentage S($\gamma$) of $\gamma$-$Al_2O_3$ is represented by B %, and an area percentage S(o) of $Al_2O_3$ having another crystal structures is represented by C %, $80 \le A+B \le 100$ (where $0 \le A \le 40$, $40 \le B \le 100$) and $0 \le C \le 20$ (A+B+C=100).

Advantageous Effects of Invention

According to the invention of [1] above, the iron loss is reduced.

According to the invention of [2] above, the eddy current loss can be further reduced.

According to the invention of [3] above, the eddy current loss can be further reduced.

According to the invention of [4] above, the hysteresis loss can be further reduced.

According to the invention of [5] above, the iron loss can be further reduced.

BRIEF DESCRIPTION OF DRAWINGS

FIG. 4 illustrates a perspective view of a dust core that is cut into halves along an axial line.

DESCRIPTION OF EMBODIMENTS

Hereafter, the present invention will be described in detail. In the present specification, a description of a range of numerical values expressed by using "to" means a range including the lower limit value and the upper limit value unless otherwise noted. For example, in a description of "10 to 20", both "10" which is the lower limit value and "20" which is the upper limit value are included. That is, "10 to 20" has the same meaning as "10 or more and 20 or less".

1. Configuration of Dust Core 1

Figure 1:
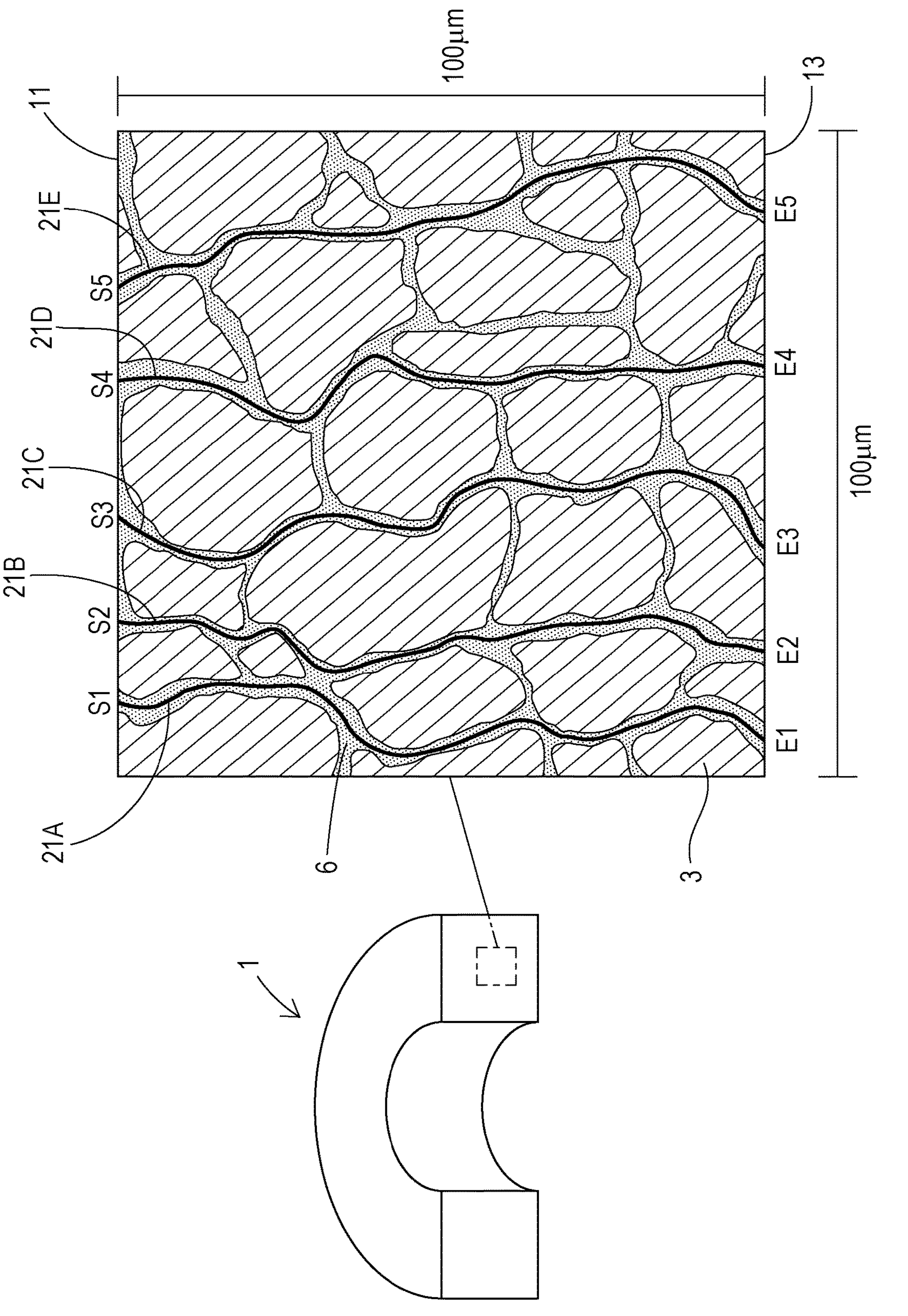
FIG. 1 is a schematic view illustrating a dust core. The figure on the right is a schematic view of a sectional structure of the dust core observed in a second field of view of a 100 μm×100 μm square.

A dust core 1 includes soft magnetic metal particles 3 having an average particle size of 5 μm or more and 30 μm or less, and a particle boundary phase 6, as illustrated in the figure (sectional view) on the right in FIG. 1. The hatching (parallel lines) in FIG. 1 indicates the soft magnetic metal particles 3. The dotted area in FIG. 1 indicates the particle boundary phase 6.

The particle boundary phase 6 includes a polycrystalline compound containing Al (aluminum).

When a sectional structure of the dust core 1 is observed, an area percentage of α-$Al_2O_3$ in the particle boundary phase 6 is 75% or less.

The dust core 1 further satisfies the following condition relating to the thickness of the particle boundary phase 6.

The sectional structure of the dust core 1 is observed in a first field of view of a 150 μm×150 μm square. In a region where the particle boundary phase 6 is located in an H-letter shape, two intersecting points O1 and O2 where two vertical lines and one horizontal line that constitute the H letter intersect are connected with a straight line. When a perpendicular bisector LH of this straight line is drawn, a crossing width at a position where the perpendicular bisector LH crosses the particle boundary phase 6 is defined as a thickness Tn of the particle boundary phase 6. The thickness of the particle boundary phase 6 is measured at five positions to respectively determine Tn (where n is an integer of 1 to 5), and an average thickness Ta which is an average of Tn (where n is an integer of 1 to 5) is calculated. The condition relating to the thickness of the particle boundary phase 6 is that this average thickness Ta is 10 nm or more and 300 nm or less.

The particle boundary phase 6 has a property of a high resistance.

FIG. 1 illustrates a dust core 1 having a toroidal shape as an example. The shape of the dust core 1 is not particularly limited. FIG. 1 illustrates a section of the dust core 1 taken along the axial direction thereof.

(1) Soft Magnetic Metal Particles 3

As the soft magnetic metal particles 3, a wide variety of soft magnetic metal particles can be used without particular limitation. As the soft magnetic metal particles 3, soft magnetic pure iron particles or iron-based alloy particles can be widely used. As the iron-based alloys, for example, Fe—Si—Cr alloys, Fe—Si—Al alloys (Sendust), Ni—Fe alloys (permalloys), Ni—Fe—Mo alloys (supermalloys), Fe-based amorphous alloys, Fe—Si alloys, Ni—Fe alloys, and Fe—Co alloys can be suitably used. Among these, Fe—Si—Cr alloys, Ni—Fe alloys (permalloys), Ni—Fe—Mo alloys (supermalloys), and Fe-based amorphous alloys are preferred in view of magnetic permeability, coercive force, and frequency characteristics.

In the case of using an Fe—Si—Cr alloys, an alloy having a following composition can be used; for example, Si: 0.1% to 10% by mass, Cr: 0.1% to 10% by mass, and the balance: Fe and unavoidable impurities.

The average particle size of the soft magnetic metal particles 3 is 5 μm or more and 30 μm or less, preferably 10 μm or more and 25 μm or less, and more preferably 15 μm or more and 22 μm or less. The average particle size of the soft magnetic metal particles 3 can be appropriately changed in accordance with the frequency band to be used. In particular, in the case of assuming the use in a high-frequency band exceeding 100 kHz, the average particle size is more preferably 10 μm or more and 25 μm or less. When the dust core 1 is used in a high-frequency band, an eddy current is generated within the particles, resulting in loss (eddy current loss). The amount of eddy current generated is proportional to the square of the frequency and is inversely proportional to the particle size.

Accordingly, when the dust core 1 is used in the kHz band, the particle size is preferably small. The average particle size of the soft magnetic metal particles 3 is determined by observing a section of the dust core 1 with an FE-SEM JSM-6330F to determine particle areas, and calculating area equivalent circle diameters from the particle areas.

The soft magnetic metal particles 3 may include a metal oxide layer (passivation film) on the surfaces thereof. The metal oxide layer on the surfaces can enhance adhesion to the particle boundary phase 6.

The metal oxide that forms the metal oxide layer is not particularly limited. For example, at least one metal oxide selected from the group consisting of chromium oxide, aluminum oxide, molybdenum oxide, and tungsten oxide is preferred. In particular, the metal oxide preferably includes at least one of chromium oxide and aluminum oxide. The use of any of these preferred metal oxides effectively reduces the eddy current loss.

When particles of an Fe—Si—Cr alloy are used as the soft magnetic metal particles 3, a metal oxide layer having chromium oxide ($Cr_2O_3$) can be easily formed. Specifically, Cr in the Fe—Si—Cr alloy is oxidized to thereby form a metal oxide layer on outer edge portions of the soft magnetic metal particles 3.

The thickness of the metal oxide layer is not particularly limited. The thickness can be preferably 1 nm or more and 20 nm or less. The thickness of the metal oxide layer can be measured by X-ray photoelectron spectroscopy (XPS).

An average aspect ratio of the soft magnetic metal particles 3 is not particularly limited. The average aspect ratio of the soft magnetic metal particles 3 is preferably 1.15 or more and 1.40 or less, and more preferably 1.2 or more and 1.35 or less.

When the soft magnetic metal particles 3 have an average aspect ratio within this range, the hysteresis loss can be further reduced.

(2) Particle Boundary Phase 6

(2.1) Polycrystalline Compound Containing Al (Aluminum)

The particle boundary phase 6 includes a polycrystalline compound containing Al (aluminum), as described above. The polycrystalline compound containing Al (aluminum) is a crystalline compound derived from an alumina sol. The polycrystalline compound containing Al (aluminum) is produced by, for example, subjecting an alumina sol to heat treatment. Examples of the polycrystalline compound containing Al (aluminum) include Al-containing compounds such as γ-alumina particles, θ-alumina particles, and boehmite.

Particles of the polycrystalline compound preferably have a particle size of 25 nm or more and 200 nm or less from the viewpoint of reducing the eddy current loss.

The particle size of the polycrystalline compound is determined by observing a section of the dust core 1 with an FE-SEM (for example, JSM-6330F) to determine a particle area, and calculating an area equivalent circle diameter from the particle area.

(2.2) Area Percentage of $\alpha$-$Al_2O_3$

When the sectional structure of the dust core 1 is observed and, in the particle boundary phase 6, the total area of the particle boundary phase 6 is assumed to be 100%, an area percentage of $\alpha$-$Al_2O_3$ in this total area is 75% or less, preferably 50% or less, and more preferably 40% or less. The area percentage of $\alpha$-$Al_2O_3$ may be 0%. This is because, when the area percentage of $\alpha$-$Al_2O_3$ is within this range, firing shrinkage during heat treatment is reduced, and thus a stress applied to boundaries of the particles tends to decrease. In addition, when the area percentage of $\alpha$-$Al_2O_3$ is within this range, the iron loss tends to decrease.

Further, when the sectional structure of the dust core 1 is observed and, in the particle boundary phase 6, the total area of the particle boundary phase 6 is assumed to be 100%, an area percentage of the polycrystalline compound containing Al (aluminum) (excluding $\alpha$-$Al_2O_3$) in the particle boundary phase 6 is preferably 25% or more and 75% or less, and more preferably 25% or more and 60% or less. When the area percentage of the polycrystalline compound (excluding $\alpha$-$Al_2O_3$) is within this range, the amount of $\alpha$-$Al_2O_3$ is small and a stress applied to boundaries of the particles is reduced, so that the strength of the dust core is increased. In addition, defects, such as pores, in the particle boundary phase 6 are reduced, and consequently, the iron loss of the dust core decreases.

In the determination of these area percentages, when pores 35 are present in the particle boundary phase 6, the area of the pores 35 is not included in the area of the particle boundary phase 6. These area percentages in the particle boundary phase 6 can each be determined by observing the sectional structure of the dust core 1 in a field of view of a 100 μm×100 μm square, and performing image analysis. Specifically, the area percentages are determined as follows. The observation is performed with an FE-SEM (for example, FE-SEM JSM-6330F), and a photograph is binarized. In this case, the image is adjusted such that pores are shown in black. The image analysis software is not particularly limited. For example, "Win-Roof" can be used.

(2.3) Condition Relating to Thickness of Particle Boundary Phase 6

The dust core 1 satisfies the following condition relating to the thickness of the particle boundary phase 6.

The condition relating to the thickness of the particle boundary phase 6 will be described with reference to FIGS. 2 and 3.

First, measurement of the thickness of the particle boundary phase 6 will be described with reference to FIG. 2.

In the measurement of the thickness of the particle boundary phase 6, the sectional structure of the dust core 1 is observed by a backscattered electron image of a scanning electron microscope (SEM) in a first field of view of a 150 μm×150 μm square. In the case where the dust core 1 has a toroidal shape, a section taken in a direction perpendicular to the upper surface is observed as illustrated in FIG. 1.

Figure 2:
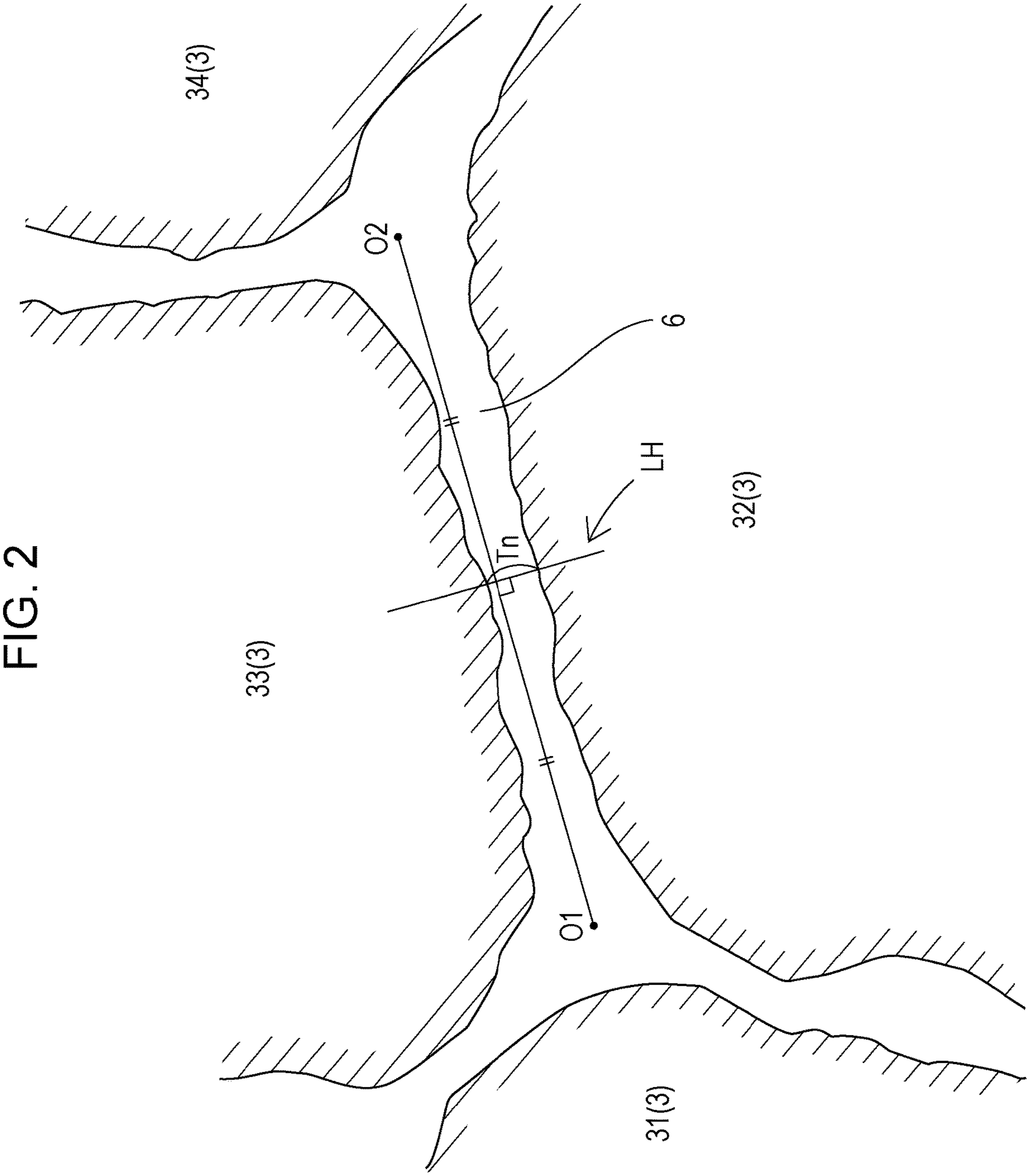
FIG. 2 is a schematic view for explaining a method for determining a thickness of a particle boundary phase 6.

Here, a region where the particle boundary phase 6 is located in an H-letter shape as illustrated in FIG. 2 is selected. When two intersecting points O1 and O2 where two vertical lines and one horizontal line that constitute the H letter intersect are connected with a straight line, and a perpendicular bisector LH of this straight line is drawn, a crossing width at a position where the perpendicular bisector LH crosses the particle boundary phase 6 is defined as a thickness Tn of the particle boundary phase 6.

Figure 3:
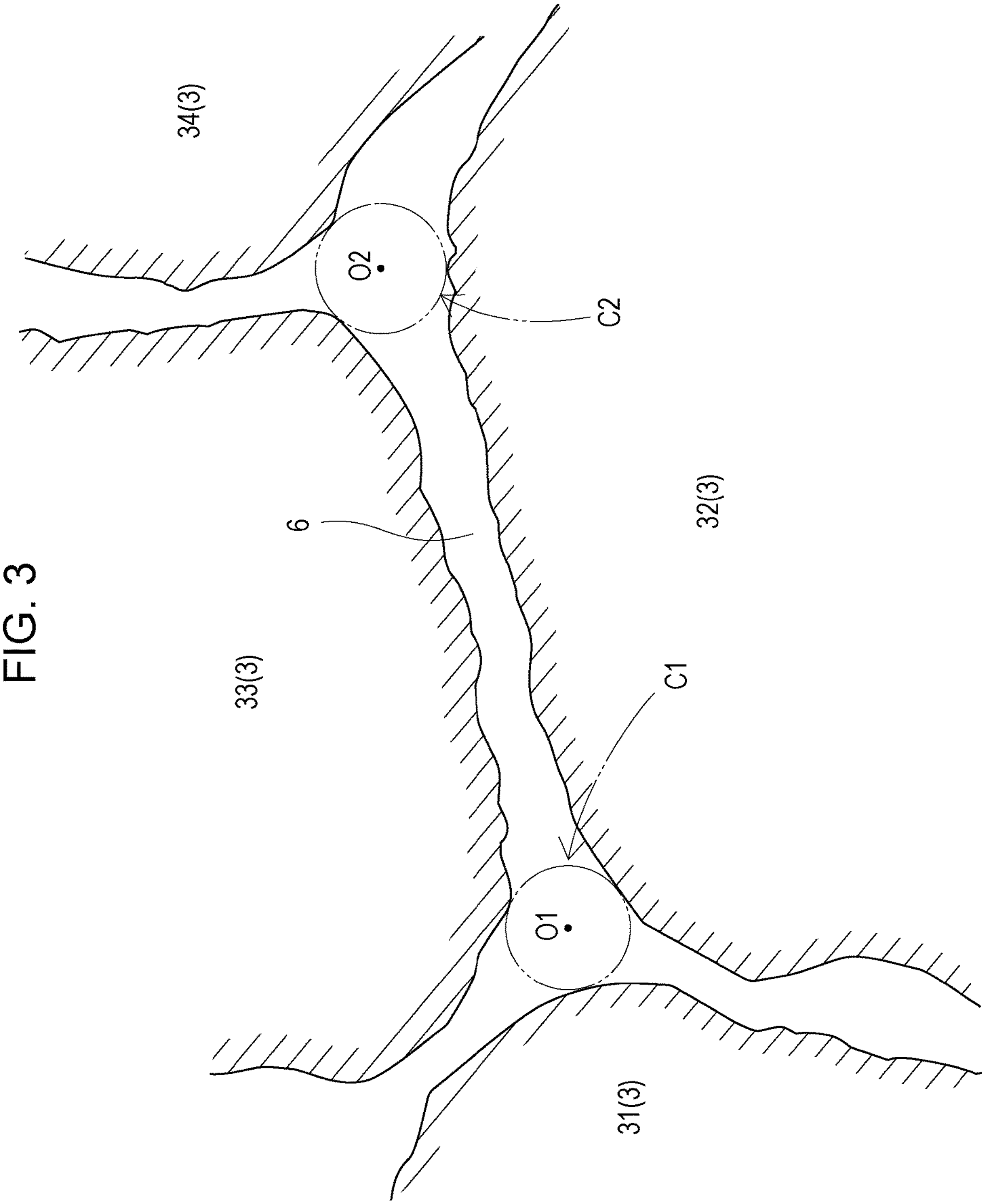
FIG. 3 is a schematic view for explaining a method for determining a thickness of a particle boundary phase 6.

In the determination of the intersecting point O, the center of an imaginary circle C1 is defined as the intersecting point O1, the imaginary circle C1 being inscribed in all three soft magnetic metal particles 31, 32, and 33 that are present around the position where the two vertical lines and the one horizontal line that constitute the H letter intersect (refer to FIG. 3). Similarly, In the determination of the intersecting point O2, the center of an imaginary circle C2 is defined as the intersecting point O2, the imaginary circle C2 being inscribed in all three soft magnetic metal particles 32, 33, and 34 that are present around the position where the two vertical lines and the one horizontal line that constitute the H letter intersect (refer to FIG. 3).

The thickness of the particle boundary phase 6 is measured at five positions to determine Tn (where n is an integer of 1 to 5) respectively, and an average thickness Ta which is an average of Tn (where n is an integer of 1 to 5) is calculated. In the present invention, the average thickness Ta is preferably 10 nm or more and 300 nm or less, and more preferably 25 nm or more and 200 nm or less.

(2.4) Assumed Reasons for Reducing Iron Loss of Dust Core 1

The inventors of the present invention have conducted extensive studies in order to reduce the iron loss of the dust core 1. As a result, it has been found that when a dust core 1 using soft magnetic metal particles 3 having an average particle size within a specific range satisfies conditions below, a desired effect is achieved.

Specifically, the inventors of the present invention have found an unexpected fact that when the particle boundary phase 6 includes a polycrystalline compound containing Al (aluminum), and when the area percentage of $\alpha$-$Al_2O_3$ in the particle boundary phase 6 is 75% or less, and the thickness of the particle boundary phase 6 satisfies a specific condition, the iron loss of the dust core 1 can be reduced. The present invention has been made on the basis of this finding.

The reason why the desired effect is obtained in the present embodiment is not clear but may be as follows.

The polycrystalline compound containing Al (aluminum) contributes to providing a higher resistance of the particle boundary phase 6.

Furthermore, in the dust core 1 of the present embodiment, satisfaction of the specific condition relating to the thickness of the particle boundary phase 6 probably contributes to an improvement in the resistance value and a reduction in the hysteresis loss of the dust core 1.

Considering the above assumed reasons comprehensively, when the dust core 1 of the present embodiment satisfies various specific conditions, these conditions may be involved in a combined manner to thereby reduce the iron loss of the dust core 1 compared with the related art.

There are many known technologies in which a nonferrous metal oxide is present at particle boundaries; however, the shape of the dust core 1 is basically formed by using glass or a resin during forming. Therefore, the particle boundaries have a large thickness, and the amount of a soft magnetic metal of the dust core 1 is reduced. As a result, the hysteresis loss of the dust core 1 increases. Furthermore, the electrical resistance is reduced by heat generated during actual use, resulting in an increase in the eddy current loss.

In the present invention, the particle boundaries include a polycrystalline compound to thereby solve the problem described above.

(2.5) Ratio of Amount of Al to Amount of Oxygen in Particle Boundary Phase 6

A ratio of an amount of Al to an amount of oxygen in the particle boundary phase 6 is not particularly limited. The ratio of the amount of Al to the amount of oxygen in the particle boundary phase 6 is preferably Al:O (molar ratio)=2.0:2.5 to 2.0:2.9, and more preferably 2.0:2.55 to 2.0:2.85.

The eddy current loss can be further reduced within this range.

If the temperature during heat treatment of the dust core is low, AlO(OH) (boehmite) is generated, and the eddy current loss cannot be reduced in this case. Therefore, Al:O (molar ratio) is preferably 2.0:2.5 to 2.0:2.9.

The ratio of the amount of Al to the amount of oxygen can be calculated on the basis of the amount of Al determined by ICP analysis and the amount of oxygen determined by oxygen content measurement.

The ratio of the amount of Al to the amount of oxygen can be adjusted by the oxygen partial pressure during heat treatment.

(2.6) First Condition Relating to Continuous Layer 21

The dust core 1 according to the present invention preferably satisfies the following first condition and second condition relating to a continuous layer 21 when the sectional structure of the dust core 1 is observed in a second field of view of a 100 μm×100 μm square.

The first condition will be described. The figure on the right in FIG. 1 schematically illustrates a second field of view of a 100 μm×100 μm square when the sectional structure of the dust core 1 is observed.

On one side 11 of the square defining the second field of view, a position at which the particle boundary phase 6 is present is defined as a start point S. The first condition is that there are five or more routes (paths) that are different from each other when a portion where the particle boundary phase 6 is continuous is traced from the start point S on the one side 11 to a side 13 opposing the one side 11 of the square. Specifically, the first condition is that there are five or more continuous layers 21 that are different from each other. When there is a branching point in the middle of the tracing route, the shortest route to reach the opposing side 13 is selected.

There is no upper limit value of the number of routes as long as there are five or more routes that are different from each other; however, the upper limit value is usually 30.

FIG. 1 illustrates an example in which there are five different continuous layers 21A, 21B, 21C, 21D, and 21E which start from five different start points S1, S2, S3, S4, and S5 on the one side 11 and end at different end points E1, E2, E3, E4, and E5, respectively.

When this first condition is satisfied, there are a large number of continuous layers 21 in the dust core 1.

Therefore, the resistance value of the particle boundary phase 6 is increased, and the eddy current loss can be reduced. Further, when this condition is satisfied, the dust core 1 has a good heat conduction performance. In addition, soft magnetic metal particles 3 adjacent to each other are effectively insulated from each other by the particle boundary phase 6, which enhances the withstand voltage characteristics. Furthermore, the continuous layers 21 of the particle boundary phase 6 bind the soft magnetic metal particles 3 together, which improves the mechanical strength of the dust core 1.

In the observation of the sectional structure of the dust core 1, multiple fields of view of a 100 μm×100 μm square are observed. The first condition only needs to be satisfied in at least one of the multiple fields of view.

In order for five or more continuous layers 21 to present, the particle size of the soft magnetic metal may be controlled.

(2.7) Second Condition Relating to Continuous Layer 21

Next, the second condition will be described. The second condition is that an average length of paths of the continuous layers 21 from the one side 11 to the opposing side 13 is 115 μm or more.

The average length of the paths of the continuous layers 21 is preferably 120 μm or more, and more preferably 130 μm or more. The upper limit value of the average length of the paths of the continuous layers 21 is 150 μm.

In the example illustrated in FIG. 1, this second condition is that the average length of the paths of the continuous layers 21A, 21B, 21C, 21D, and 21E is 115 μm or more.

When this second condition is satisfied, the average length of the continuous layers 21 is longer than 100 μm, which is the length of a side of the first field of view.

That is, the continuous layers 21 each meander in a path from the one side 11 to the opposing side 13. When the continuous layer 21 meanders, the resistance value of the particle boundary phase 6 is increased, and the eddy current loss is reduced compared with the case where the continuous layer 21 is linear. Furthermore, when this condition is satisfied, the dust core 1 has a good heat conduction performance. However, since alumina has a thermal conductivity of 32 W/m·K whereas the soft magnetic metal has a thermal conductivity of 50 to 100 W/m·K, if the continuous layers 21 meander extremely, they serve as a thermal resistance and the heat conduction performance is degraded.

The average length of the continuous layers 21 is controlled by, for example, the press pressure during press forming described below. By applying a press pressure of 1 GPa to 2.5 GPa at 60° C. to 300° C., the soft magnetic metal particles 3 are intricately formed into a meandering structure.

In the observation of the sectional structure of the dust core 1, multiple fields of view of a 100 μm×100 μm square are observed. The second condition only needs to be satisfied in at least one of the multiple fields of view.

(2.8) Condition Relating to Pores 35

From the viewpoint of further reducing the hysteresis loss, the dust core 1 preferably satisfies the following condition relating to pores 35. From the viewpoint of increasing the saturation magnetic flux density and further reducing the hysteresis loss, the dust core 1 preferably has a smaller number of pores 35. The pores 35 have no magnetic properties and thus decrease the saturation magnetic flux density of the dust core 1, resulting in an increase in the size of the dust core 1. Furthermore, the presence of the pores 35 serves as magnetic resistance and increases the hysteresis loss. The pores 35 can be reduced by pressing at a high pressure and incorporating $\gamma$-$Al_2O_3$.

The sectional structure of the dust core 1 is observed in a third field of view of a 100 μm×100 μm square, and an area percentage P (%) of the pores 35 in the third field of view is determined. When the maximum value of the area percentage P is represented by P1 and the minimum value of the area percentage P is represented by P2 , the difference between P1 and P2 is preferably 3% or less, more preferably 2.5% or less, and still more preferably 1.0% or less. The difference between P1 and P2 may be 0%.

Figure 4:
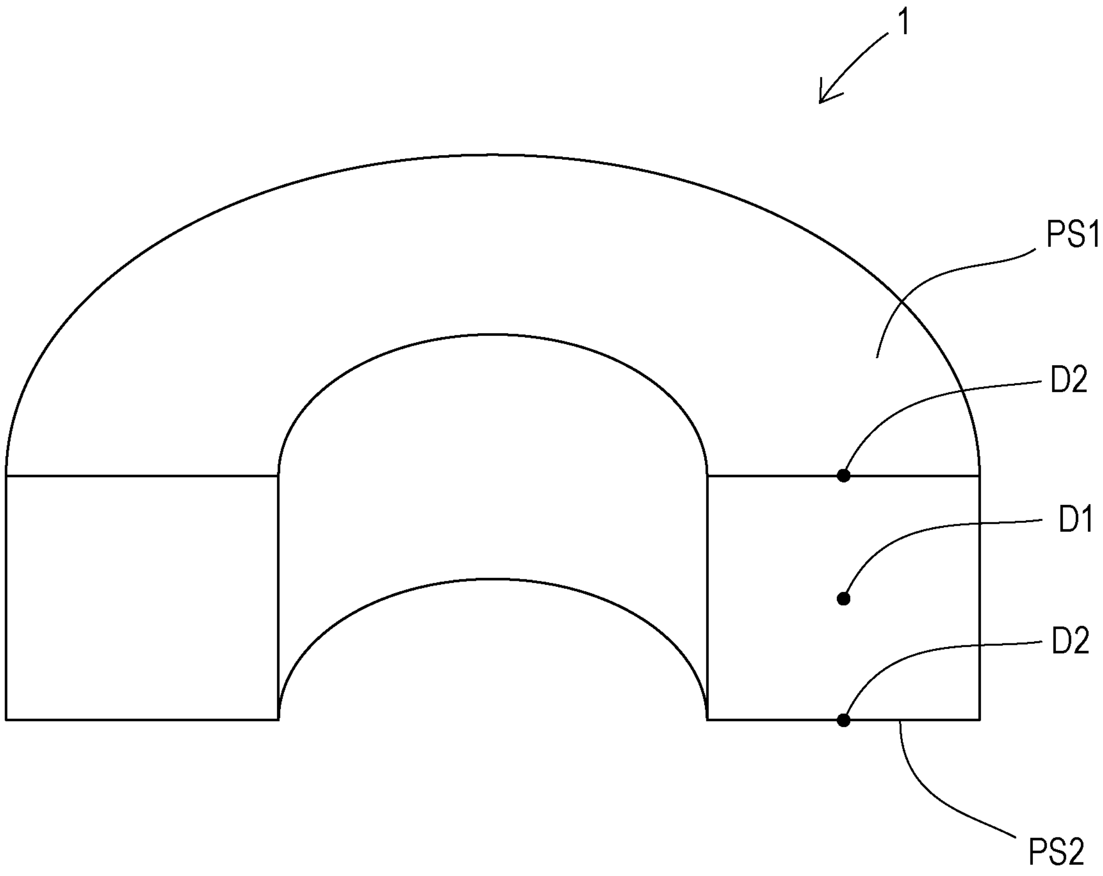
FIG. 4 is a perspective view of a dust core for explaining a condition relating to pores 35.

Here, this condition will be described with reference to FIGS. 4 to 6.

First, a description will be made of a method for determining, in the observation of the sectional structure of the dust core 1, a region D1in which the area percentage P of pores 35 in the third field of view is the largest and a region D2in which the area percentage P of pores 35 in the third field of view is the smallest. The dust core 1 is produced by press forming with a pair of molds. Surfaces to which a pressure has been applied by the pair of molds are specified by the shape of the dust core 1. For example, in the dust core 1 having a toroidal shape in FIG. 4, the surfaces to which a pressure has been applied are a press surface PS1 and a press surface PS2.

Regions where the highest pressure has been applied are regions near the press surfaces PS1 and PS2, and can be uniquely specified by those skilled in the art on the basis of, for example, simulation or experience. For example, in the case of the dust core 1 in FIG. 4, the regions denoted by symbol D2 are regions where the highest pressure has been applied. On the other hand, a region where the lowest pressure has been applied can be uniquely specified by those skilled in the art on the basis of, for example, simulation or experience. For example, in the case of the dust core 1 in FIG. 4, the region denoted by symbol D1 is a region where the lowest pressure has been applied.

Figure 5:
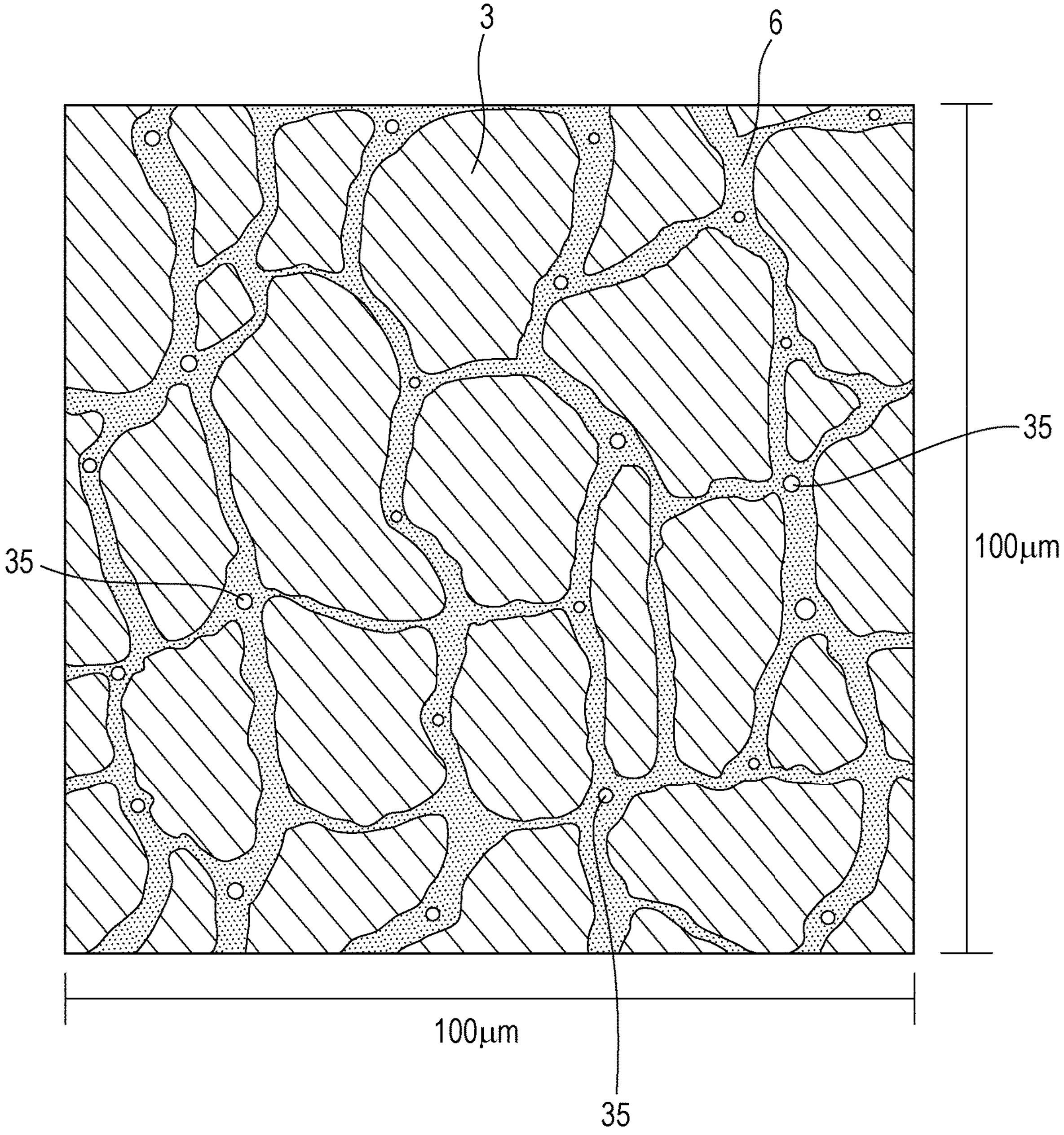
FIG. 5 is a schematic view of a region denoted by D1 observed in a third field of view of a 100 μm×100 μm square.

In the region D1 where the lowest pressure has been applied, the sectional structure of the dust core 1 is observed in the third field of view of a 100 μm×100 μm square to determine the area percentage P (%) of pores 35 in the third field of view (refer to FIG. 5). The area percentage P (%) in the region D1 where the lowest pressure has been applied corresponds to the maximum value P1 (%) of the area percentage P. That is, the region denoted by D1 is a region where the lowest pressure has been applied so that the largest number of pores 35 may remain.

Figure 6:
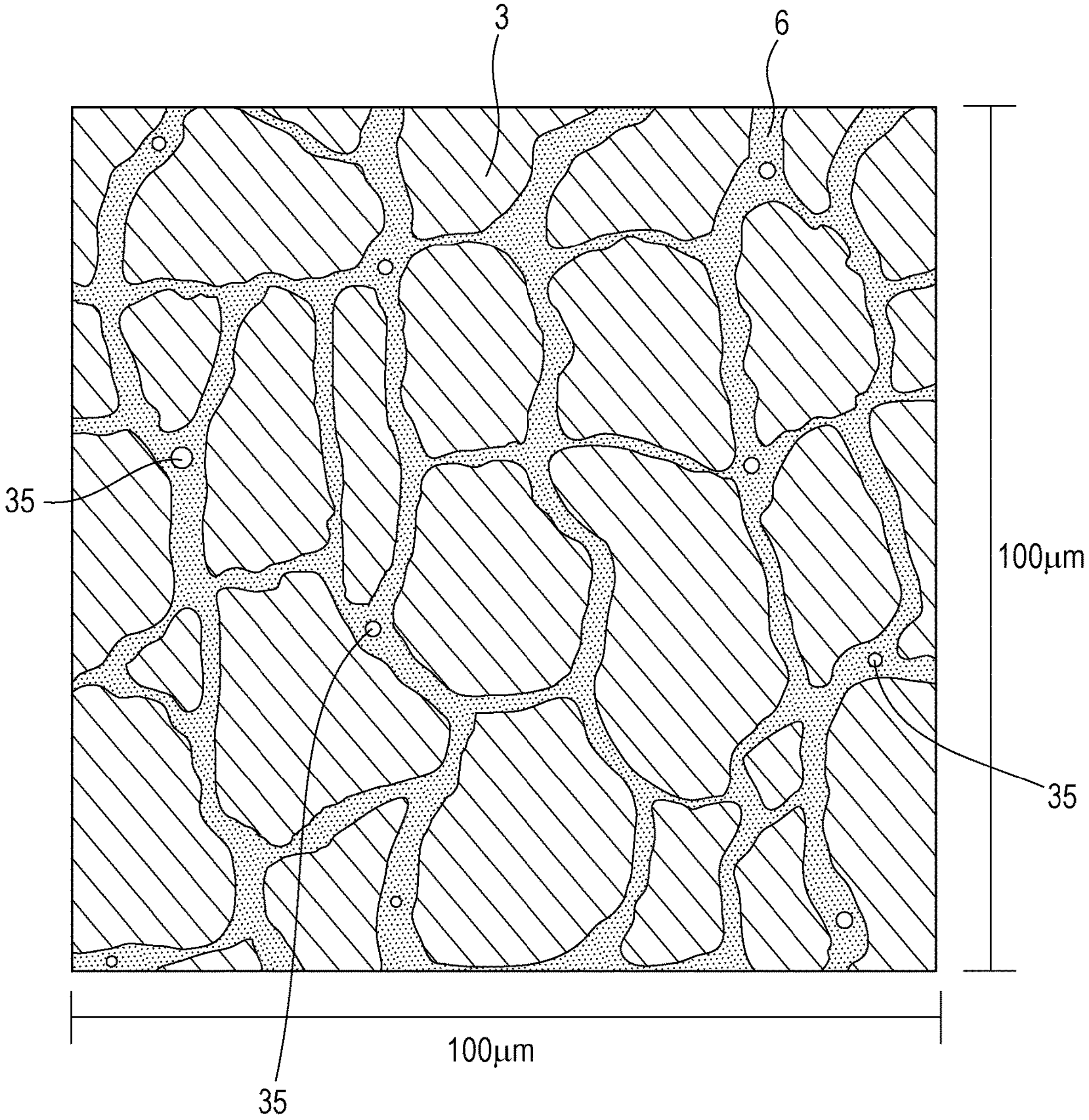
FIG. 6 is a schematic view of a region denoted by D2 observed in a third field of view of a 100 μm×100 μm square.

On the other hand, in a region D2 where the highest pressure has been applied, the sectional structure of the dust core 1 is observed in the third field of view of a 100 μm×100 μm square to determine the area percentage P (%) of pores 35 in the third field of view (refer to FIG. 6).

The area percentage P (%) in the region D2 where the highest pressure has been applied corresponds to the minimum value P2 (%) of the area percentage P. That is, the region denoted by D2 is a region where the highest pressure has been applied so that the number of pores 35 is the smallest.

Thus, the difference between P1 and P2 can be determined where P1 represents the maximum value of the area percentage P and P2 represents the minimum value of the area percentage P.

(2.9) Condition of Area Percentage S(α) of $\alpha$-$Al_2O_3$, Area Percentage S(γ) of $\gamma$-$Al_2O_3$, and Area Percentage S(o) of $Al_2O_3$ Having Another Crystal Structure In the observation of the sectional structure of the dust core 1, an area percentage S(Al) of the polycrystalline compound containing Al (aluminum) in the particle boundary phase 6 is 85% or more and 100% or less, and when, in the area percentage S(Al), an area percentage S(α) of $\alpha$-$Al_2O_3$ is represented by A %, an area percentage S(γ) of $\gamma$-$Al_2O_3$ is represented by B %, and an area percentage S(o) of $Al_2O_3$ having another crystal structure is represented by C %, all the following relational expressions are preferably satisfied.

$$80 \le A+B \le 100 (\text{where } 0 \le A \le 40, 40 \le B \le 100)$$

$$0 \le C \le 20 (A+B+C=100)$$

When the particle boundary phase 6 contains $\alpha$-$Al_2O_3$, the generation of an eddy current can be suppressed due to high electrical resistance of $\alpha$-$Al_2O_3$. An aluminum (Al)-containing polycrystalline compound (such as $\gamma$-$Al_2O_3$) other than $\alpha$-$Al_2O_3$ generally has a smaller particle size than $\alpha$-$Al_2O_3$ and can enter a gap of the particle boundary phase even in the case where the thickness of the particle boundary phase is on the order of nanometer. In the dust core 1, pores are not generated but are occupied by an insulator.

Therefore, $\alpha$-$Al_2O_3$ and $Al_2O_3$ having another crystal structure preferably coexist. In view of the amount of pores generated in particle boundaries, the area percentage of $\alpha$-$Al_2O_3$ in the particle boundary phase 6 is preferably 75% or less.

Besides polycrystalline alumina, for example, low-melting-point glass capable of filling pores may also be contained. However, even in such a case, polycrystalline $Al_2O_3$ μmust be contained in view of electrical resistance and heat resistance.

The content of polycrystalline alumina can be determined by X-ray diffraction crystallography (XRD). In the case of trace analysis, synchrotron XRD may be used.

Several reference samples are prepared by mixing various types of polycrystalline alumina in known ratios, and reference spectra are obtained by XRD. The content of polycrystalline alumina in the particle boundary phase 6 is determined from the reference spectra obtained above and a spectrum of the particle boundary phase 6.

In determination of these area percentages, when pores 35 are present in the particle boundary phase 6, the area of the pores 35 is not included in the area of the particle boundary phase 6. These area percentages in the particle boundary phase 6 can each be determined by observing the sectional structure of the dust core 1 in a field of view of a 100 μm×100 μm square, and performing image analysis. Specifically, the area percentages are determined as follows. The observation is performed with an FE-SEM (for example, FE-SEM JSM-6330F), and a photograph is binarized. In this case, the image is adjusted such that pores are shown in black. The image analysis software is not particularly limited. For example, "Win-Roof" can be used.

2. Method for Producing Dust Core 1

Figure 7:
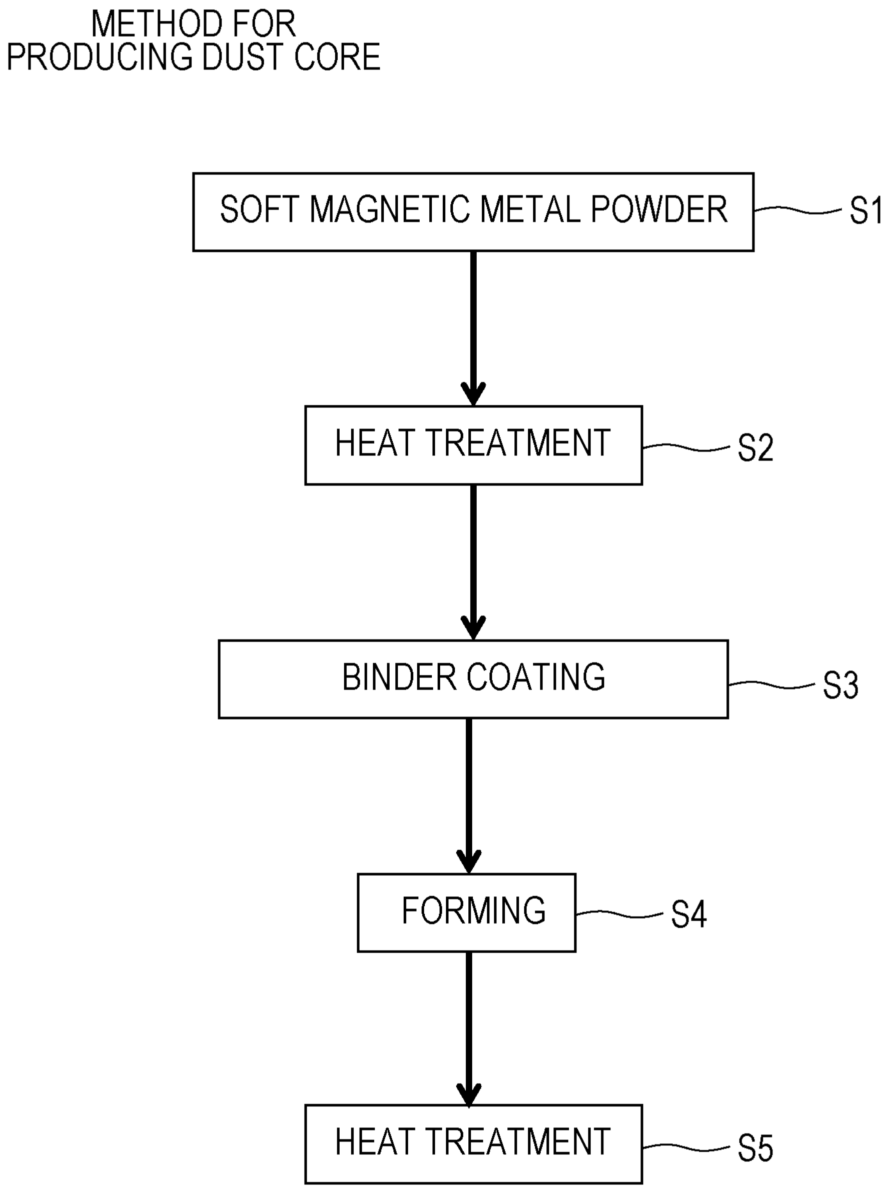
FIG. 7 is a process chart showing an example of a method for producing a dust core.

The method for producing a dust core 1 is not particularly limited. FIG. 7 shows an example of the method for producing a dust core 1, and this production method is described below.

(1) Preparation of Soft Magnetic Metal Powder

First, a soft magnetic metal powder (soft magnetic metal particle 3) serving as a raw material is prepared (step S1).

(2) Heat Treatment

Next, the soft magnetic metal powder is subjected to heat treatment (step S2). Conditions for this heat treatment are not particularly limited. As the heat treatment conditions, the following conditions are suitably used; for example, a heat treatment temperature of 700° C. to 900° C., a temperature-rising rate of 1° C. to 10° C./min, a holding time of 1 μminute to 120 μminutes, and an inert atmosphere ($N_2$ atmosphere or Ar atmosphere).

(3) Binder Coating

Next, the soft magnetic metal powder is coated with a binder (step S3). The coating method is not particularly limited. For example, a spray coating method, a dipping method, or a wet mixing method is suitably used. The binder includes polycrystalline compound particles (for example, aluminum compound particles). Specifically, an alumina sol, which is a colloidal solution of hydrated alumina, can be suitably used as the binder. The soft magnetic metal powder after coating is dried under conditions of, for example, a drying temperature of 60° C. to 150° C. and a drying time of 30 μminutes to 120 μminutes.

(4) Forming (Press Forming)

To form the shape of the dust core 1, press forming (for example, metallic mold uniaxial forming) is usually employed (step S4). The press pressure during press forming is preferably 1.2 GPa to 2.4 GPa. To produce a compact having a high density, pressing is preferably performed at a high pressure. The metallic mold may be heated in a range of room temperature to 200° C. during press forming. Heating of the metallic mold facilitates plastic deformation of the soft magnetic metal powder to provide a compact having a high density. On the other hand, press forming at a temperature exceeding 200° C. is not preferable because a problem of oxidation of the soft magnetic metal powder may occur.

(5) Heat Treatment

The compact obtained as described above is subjected to heat treatment (annealing) to release strain introduced during press forming (step S5). As the heat treatment conditions, the following conditions are suitably used; for example, a heat treatment temperature of 700° C. to 900° C., a temperature-rising rate of 1° C. to 10° C./min, a holding time of 1 μminute to 120 μminutes, and an inert atmosphere ($N_2$ atmosphere or Ar atmosphere).

The conditions for the heat treatment are appropriately changed in accordance with the type of the soft magnetic metal powder used.

3. Operation and Effect of Dust Core 1 of the Present Embodiment

According to the dust core 1 of the present embodiment, the iron loss is reduced.

Since the dust core 1 satisfies the condition relating to the ratio of the amount of Al to the amount of oxygen, the hysteresis loss is reduced.

Since the dust core 1 satisfies the first condition and the second condition relating to the continuous layer 21, the eddy current loss can be further reduced.

Since the dust core 1 satisfies the condition relating to the pores 35, the hysteresis loss can be further reduced.

If the temperature during heat treatment of the dust core 1 is low, AlO(OH) (boehmite) is generated, and the eddy current loss cannot be reduced in this case. Therefore, Al:O (molar ratio) is preferably 2.0:2.5 to 2.0:2.9.

EXAMPLES

Hereafter, the present invention will be more specifically described by way of Examples.

<Experiment A>

Experimental Examples 1-1 to 1-15 are Examples, and Experimental Examples 1-16 to 1-21 are Comparative Examples.

In Table 1, Experimental Examples are denoted by using "no.". In Table 1, cases marked with "*", such as "1-16*", represent Comparative Examples.

1. Production of Dust Core (1) Experimental Examples 1-1 to 1-17 and 1-19 to 1-21 (nos. 1-1 to 1-17 and 1-19 to 1-21)

Various particles having average particle sizes shown in Table 1 were used as soft magnetic metal particles (raw material powders). In Table 1, the expression "Fe—Si—Cr" means Fe-5.5 μmass % Si-4.0 μmass % Cr particles produced by a water atomization method.

First, the soft magnetic metal powders were subjected to heat treatment. The heat treatment was conducted under the conditions of a heat treatment temperature of 200° C. to 900° C., a temperature-rising rate of 1.0° C./min to 10° C./min, a holding time of 10 μminutes to 45 μminutes, and an inert atmosphere (Ar or $N_2$) or a vacuum atmosphere.

Next, the soft magnetic metal particles were coated with a coating liquid. An alumina sol was used as the coating liquid.

The soft magnetic metal particles after coating were dried under the conditions of a temperature of 60° C. to 150° C. and a drying time of 60 μminutes to 180 μminutes.

The soft magnetic metal particles were then subjected to press forming at a press pressure of 1.0 GPa to 2.5 GPa to form compacts (toroidal shape (outer diameter: 8 mm, inner diameter: 4.5 mm, height: 1.5 mm)). The compacts were subjected to heat treatment under the conditions of a heat treatment temperature of 400° C. to 900° C., a temperature-rising rate of 1.0° C./min to 10° C./min, a holding time of 10 μminutes to 45 μminutes, and an inert atmosphere (Ar or $N_2$) or a vacuum atmosphere. Dust cores according to Experimental Examples 1-1 to 1-17 and 1-19 to 1-21 were produced as described above.

In Table 1, the term "present" in the column of "polycrystalline compound" means that a polycrystalline compound (excluding $\alpha$-$Al_2O_3$) containing Al (aluminum) is present in the dust core, and the symbol "-" in the column of "polycrystalline compound" means that no polycrystalline compound (excluding $\alpha$-$Al_2O_3$) containing Al (aluminum) is present in the dust core. The content of polycrystalline alumina can be determined by X-ray diffraction crystallography (XRD). In the case of trace analysis, synchrotron XRD may be used.

The term "$\alpha$-alumina occupation ratio" in Table 1 means the area percentage of $\alpha$-$Al_2O_3$ calculated by the method described in the paragraph of "(2.2) Area Percentage of $\alpha$-$Al_2O_3$". This area percentage of $\alpha$-$Al_2O_3$ can be controlled by the heat treatment temperature and the holding time. Specifically, when the heat treatment temperature is high and the holding time is long, the area percentage of $\alpha$-$Al_2O_3$ increases, and when the heat treatment temperature is low and the holding time is short, the area percentage of $\alpha$-$Al_2O_3$ decreases.

The column of "amount of oxygen" in Table 1 shows the amount (mole) of "O" when "Al" is "2.0" (moles) in Al:O (molar ratio) calculated by the method described in the paragraph of "(2.5) Ratio of Amount of Al to Amount of Oxygen in Particle boundary Phase 6". This amount of "O" can be controlled by the oxygen partial pressure during drying of hydrated alumina. Specifically, an increase in the oxygen partial pressure increases the amount of "O", and a decrease in the oxygen partial pressure reduces the amount of "O".

(2) Experimental Example 1-18 (no. 1-18)

Particles having the average particle size shown in Table 1 were used as soft magnetic metal particles (raw material powder).

The column of the average thickness shows the average thickness Ta measured by the method described in the paragraph of "(2.3) Condition Relating to Thickness of Particle Boundary Phase 6".

The column of the length of continuous layer shows the average length of the paths measured by the method described in the paragraph of "(2.7) Second Condition Relating to Continuous Layer 21".

The column of the difference in porosity shows the difference between P1 and P2 measured by the method described in the paragraph of "(2.8) Condition Relating to Pores 35".

The average thickness Ta of the particle boundary phase, the average length of the continuous layer, and the difference in porosity were controlled by changing the press pressure of press forming.

[Table 1]

TABLE 1

| | Soft magnetic metal particles | | | Particle boundary phase | | | | | Iron loss | |
|---|---|---|---|---|---|---|---|---|---|---|
| no. | Type | Average particle size (μm) | Polycrystalline compound | α-Alumina occupation ratio (%) | Amount of oxygen | Average thickness (μm) | Length of continuous layer (μm) | Difference in porosity (%) | Hysteresis loss | Eddy current loss |
| 1-1 | Fe—Si—Cr | 5 | Present | 75 | 2.4 | 10 | 112 | 4.3 | C | C |
| 1-2 | Permalloy | 30 | Present | 68 | 3.0 | 300 | 111 | 4.3 | C | C |
| 1-3 | Amorphous | 23 | Present | 72 | 3.0 | 132 | 113 | 3.9 | C | C |
| 1-4 | Supermalloy | 18 | Present | 71 | 3.1 | 88 | 112 | 3.9 | C | C |
| 1-5 | Sendust | 15 | Present | 67 | 3.1 | 95 | 113 | 3.5 | C | C |
| 1-6 | Sendust | 12 | Present | 68 | 2.9 | 142 | 114 | 3.4 | C | B |
| 1-7 | Sendust | 9 | Present | 66 | 2.6 | 184 | 112 | 3.3 | C | B |
| 1-8 | Sendust | 14 | Present | 68 | 2.5 | 285 | 114 | 3.5 | C | B |
| 1-9 | Sendust | 11 | Present | 65 | 2.7 | 245 | 113 | 3.2 | C | B |
| 1-10 | Sendust | 17 | Present | 55 | 2.6 | 221 | 115 | 3.4 | C | A |
| 1-11 | Sendust | 19 | Present | 48 | 2.7 | 184 | 123 | 3.3 | C | A |
| 1-12 | Sendust | 22 | Present | 52 | 2.8 | 138 | 132 | 3.2 | C | A |
| 1-13 | Sendust | 13 | Present | 56 | 2.9 | 167 | 126 | 3 | B | A |
| 1-14 | Sendust | 12 | Present | 61 | 2.5 | 182 | 129 | 2.5 | B | A |
| 1-15 | Sendust | 15 | Present | 53 | 2.8 | 155 | 128 | 2.2 | B | A |
| 1-16* | Sendust | 33 | Present | 80 | 3.1 | 25 | 107 | 5.2 | C | D |
| 1-17* | Sendust | 4 | Present | 82 | 3.1 | 34 | 128 | 5.3 | D | D |
| 1-18* | Sendust | 9 | — | — | 3.4 | 33 | 118 | 5.2 | D | E |
| 1-19* | Sendust | 27 | Present | 78 | 2.4 | 65 | 109 | 5.4 | C | D |
| 1-20* | Sendust | 18 | Present | 80 | 2.4 | 8 | 114 | 5.3 | C | E |
| 1-21* | Sendust | 22 | Present | 81 | 2.4 | 334 | 104 | 5.6 | D | C |

First, the soft magnetic metal powder was subjected to heat treatment. The heat treatment was conducted under the conditions of a heat treatment temperature of 450° C., a temperature-rising rate of 5° C./min, a holding time of 15 minutes, and an inert atmosphere (Ar).

Next, the soft magnetic metal particles were coated with a coating liquid. A silica sol was used as the coating liquid.

The soft magnetic metal particles after coating were then dried under the conditions of a temperature of 60° C. and a drying time of 60 μminutes.

The soft magnetic metal particles were then subjected to press forming at a press pressure of 2.0 GPa to form a compact (toroidal shape (outer diameter: 8 mm, inner diameter: 4.5 mm, height: 1.5 mm)). The compact was subjected to heat treatment under the conditions of a heat treatment temperature of 800° C. in the case of Sendust and 500° C. in other cases, a temperature-rising rate of 5° C./min, a holding time of 10 μminutes, and an inert atmosphere (Ar). A dust core according to Experimental Example 1-18 was produced as described above.

Table 1 summarizes properties of soft magnetic metal particles and a particle boundary phase of each Experimental Example.

2. Method for Evaluating Iron Loss

The iron loss was evaluated with a measurement device (B-H analyzer, manufactured by Iwatsu Electric Co., Ltd., Model number SY-8218) under the conditions described below by using the modified Steinmetz equation below relating to the iron loss.

Core conditions: outer diameter ϕ8 mm–inner diameter ϕ4.5 mm, thickness 1.5 mm

Enameled wire ϕ0.3 Number of turns 15

Bifilar wound $$P_{cv}=K_h B_m^{\beta} f+K_c(B_m f)^2+K_e(B_m f)^{1.5} \quad \text{[Math. 1]}$$

$P_{cv}$: iron loss $K_h B_m^{\beta} f$: hysteresis loss term $K_c(B_m f)^2$: eddy current loss term $K_e(B_m f)^{1.5}$: residual loss term The evaluation was performed as follows.

Hysteresis loss ($kW/m^3$)

"A": less than 600

"B": 600 or more and less than 700

"C": 700 or more and less than 800

"D": 800 or more and less than 900

"E": 900 or more

Eddy current loss ($kW/m^3$)
"A": less than 15
"B": 15 or more and less than 30
"C": 30 or more and less than 50
"D": 50 or more and less than 80
"E": 80 or more 3. Evaluation Results Table 1 shows the evaluation results.

Experimental Examples 1-1 to 1-15, which are Examples, satisfy conditions (a), (b), (c), and (d) below.

Condition (a): The average particle size of the soft magnetic metal particles is 5 μm or more and 30 μm or less.

Condition (b): The particle boundary phase includes a polycrystalline compound containing Al (aluminum).

Condition (c): When the sectional structure of the dust core is observed, the area percentage of $\alpha$-$Al_2O_3$ in the particle boundary phase is 75% or less (corresponding to the condition relating to (2.2) Area Percentage of $\alpha$-$Al_2O_3$).

Condition (d): The average thickness Ta of the particle boundary phase is 10 nm or more and 300 nm or less (corresponding to the (2.3) Condition Relating to Thickness of Particle Boundary Phase 6).

In contrast, Experimental Examples 1-16 to 1-21, which are Comparative Examples, do not satisfy the conditions below.

Experimental Example 1-16 does not satisfy condition (a) or (c).

Experimental Example 1-17 does not satisfy condition (a) or (c).

Experimental Example 1-18 does not satisfy condition (b).

Experimental Example 1-19 does not satisfy condition (c).

Experimental Example 1-20 does not satisfy condition (c) or (d).

Experimental Example 1-21 does not satisfy condition (c) or (d).

In Experimental Examples 1-1 to 1-15, which were Examples, hysteresis loss and eddy current loss were reduced in a balanced manner compared with Experimental Examples 1-16 to 1-21, which were Comparative Examples.

Among Experimental Examples 1-1 to 1-15, which were Examples, Experimental Examples 1-6 to 1-15, which further satisfied condition (e) below, exhibited further reduced eddy current loss.

Among Experimental Examples 1-6 to 1-15, which were Examples, Experimental Examples 1-10 to 1-15, which further satisfied condition (f) below, exhibited further reduced eddy current loss.

Among Experimental Examples 1-10 to 1-15, which were Examples, Experimental Examples 1-13 to 1-15, which further satisfied condition (g) below, exhibited further reduced hysteresis loss.

Condition (e): When the ratio of the amount of Al to the amount of oxygen in the particle boundary phase is measured, Al:O (molar ratio) is 2.0:2.5 to 2.0:2.9 (corresponding to the condition relating to (2.5) Ratio of Amount of Al to Amount of Oxygen in Particle boundary Phase 6)

Condition (f): The particle boundary phase is continuously formed and has five or more continuous layers that are different from each other (corresponding to the (2.6) First Condition Relating to Continuous Layer 21), and the average length of the continuous layers is 115 μm or more (corresponding to the (2.7) Second Condition Relating to Continuous Layer 21).

Condition (g): With regard to the particle boundary phase, the difference between P1 and P2 is 3% or less (corresponding to the (2.8) Condition Relating to Pores 35).

<Experiment B>

Various dust cores shown in Table 2 were produced. The production method was similar to the method in Experiment A. In Table 2, cases marked with "*", such as "2-15*", represent Comparative Examples.

In Table 2, "S(Al) (%)" "A+B (%)", "B (%)", and "C (%)" mean the values calculated by the method described in the paragraph (2.9). These area ratios can be controlled by the amounts added in the binder coating, the heat treatment temperature, and the holding time. Specifically, the value of S(Al) can be controlled by an alumina component and another component, such as low-melting-point glass, added in the binder coating. Similarly, the values of A, B, and C can also be controlled by the alumina component added. In the case of using an alumina sol, the values are controlled by the heat treatment temperature and the holding time. When the heat treatment is performed at 800° C. or higher for a long time, the value of A increases and the values of B and C decrease. To increase the value of A, it is necessary to perform the heat treatment for one hour or more at 800° C. However, the time can be shortened by increasing the heat treatment temperature.

The method for evaluating the iron loss was the same as that in Experiment A. In Experiment B, a magnetic flux density and a thermal conductivity were also measured. The magnetic flux density was measured with a vibrating sample magnetometer (VSM). The thermal conductivity was measured by a laser flash method.

[Table 2]

TABLE 2

| | Soft magnetic metal particles | | Particle boundary layer | | | | | | | | | Iron loss | | | |
|---|---|---|---|---|---|---|---|---|---|---|---|---|---|---|---|
| no. | Type | Average particle size (μm) | α-Alumina occupation ratio (%) | S(Al) (%) | A + B (%) | B (%) | C (%) | Amount of oxygen | Average thickness (μm) | Length of continuous layer (μm) | Difference in porosity (%) | Hysteresis loss (kW/m3) | Eddy current loss (kW/m3) | Magnetic flux density (T) | Thermal conductivity (W/m · K) |
| 2-1 | Sendust | 30 | 25.2 | 84 | 77 | 47 | 23 | 2.3 | 125 | 110 | 7.5 | 680 | 730 | 0.75 | 3 |
| 2-2 | Sendust | 29 | 23.5 | 81 | 70 | 41 | 30 | 2.6 | 130 | 108 | 7.2 | 670 | 700 | 0.75 | 3 |
| 2-3 | Sendust | 30 | 23.2 | 80 | 79 | 50 | 21 | 2.6 | 133 | 109 | 7.0 | 668 | 620 | 0.73 | 3.1 |
| 2-4 | Sendust | 18 | 29.5 | 82 | 76 | 40 | 24 | 2.7 | 147 | 120 | 8.1 | 680 | 301 | 0.70 | 2.6 |
| 2-5 | Sendust | 15 | 29.9 | 83 | 97 | 61 | 3 | 2.7 | 128 | 135 | 2.7 | 411 | 357 | 0.82 | 2.4 |
| 2-6 | Sendust | 15 | 31.4 | 95 | 78 | 45 | 22 | 2.8 | 170 | 135 | 2.6 | 394 | 279 | 0.82 | 2.4 |
| 2-7 | Sendust | 15 | 3.9 | 97 | 99 | 95 | 1 | 2.7 | 158 | 135 | 2.7 | 334 | 271 | 0.82 | 2.4 |
| 2-8 | Fe | 29 | 23.2 | 83 | 75 | 47 | 25 | 2.3 | 180 | 110 | 7.5 | 1150 | 1357 | 1.9 | 3.6 |

TABLE 2-continued

| | Soft magnetic metal particles | | Particle boundary layer | | | | | | | | Differ- | Iron loss | | Mag- | |
|---|---|---|---|---|---|---|---|---|---|---|---|---|---|---|---|
| no. | Type | Average particle size (μm) | α-Alumina occupation ratio (%) | S(Al) (%) | A + B (%) | B (%) | C (%) | Amount of oxygen | Average thickness (μm) | Length of continuous layer (μm) | ence in porosity (%) | Hys-teresis loss (kW/m3) | Eddy current loss (kW/m3) | netic flux density (T) | Thermal con-ductivity (W/m · K) |
| 2-9 | Fe | 28 | 29.5 | 82 | 77 | 41 | 23 | 2.3 | 177 | 108 | 7.4 | 1149 | 1311 | 1.9 | 3.6 |
| 2-10 | Fe | 28 | 19.4 | 81 | 74 | 50 | 26 | 2.6 | 176 | 109 | 7.0 | 1112 | 1051 | 1.9 | 3.6 |
| 2-11 | Fe | 18 | 25.9 | 74 | 75 | 40 | 25 | 2.7 | 147 | 140 | 8.1 | 980 | 881 | 1.9 | 3.0 |
| 2-12 | Fe | 15 | 31.5 | 83 | 99 | 61 | 1 | 2.7 | 128 | 135 | 2.7 | 846 | 879 | 2.0 | 3.0 |
| 2-13 | Fe | 15 | 35.7 | 94 | 78 | 40 | 22 | 2.8 | 170 | 135 | 2.6 | 861 | 841 | 2.0 | 3.0 |
| 2-14 | Fe | 15 | 13.3 | 95 | 82 | 68 | 18 | 2.7 | 158 | 135 | 2.7 | 830 | 809 | 2.0 | 3.0 |
| 2-15* | Sendust | 110 | 23.2 | 80 | 79 | 50 | 21 | 2.3 | 136 | 107 | 11.0 | 1786 | 1681 | 0.76 | 2.8 |
| 2-16* | Sendust | 15 | 23.5 | 81 | 70 | 41 | 30 | 2.8 | 350 | 135 | 8.1 | 2001 | 734 | 0.80 | 2.4 |
| 2-17* | Sendust | 15 | 76.4 | 84 | 99 | 8 | 1 | 2.7 | 126 | 115 | 7.5 | 1274 | 1102 | 0.82 | 2.4 |
| 2-18* | Sendust | 100 | 78.9 | 83 | 99 | 4 | 1 | 2.6 | 350 | 108 | 6.9 | 2213 | 3611 | 0.82 | 2.4 |
| 2-19* | Fe | 105 | 28.4 | 81 | 75 | 40 | 25 | 2.3 | 136 | 109 | 10.6 | 2347 | 3619 | 2.0 | 3.2 |
| 2-20* | Fe | 15 | 10.1 | 84 | 72 | 68 | 28 | 2.7 | 350 | 135 | 8.9 | 3612 | 2843 | 1.8 | 3.0 |
| 2-21* | Fe | 15 | 80.6 | 84 | 99 | 3 | 1 | 2.6 | 116 | 115 | 7.5 | 2081 | 1999 | 2.0 | 3.0 |
| 2-22* | Fe | 100 | 75.2 | 80 | 99 | 5 | 1 | 2.2 | 350 | 108 | 10.8 | 4981 | 4760 | 1.7 | 2.5 |

Table 2 shows the evaluation results.

Experimental Examples 2-1 to 2-14, which are Examples, satisfy conditions (a), (b), (c), and (d) below.

Condition (a): The average particle size of the soft magnetic metal particles is 5 μm or more and 30 μm or less.

Condition (b): The particle boundary phase includes a polycrystalline compound containing Al (aluminum).

Condition (c): When the sectional structure of the dust core is observed, the area percentage of α-$Al_2O_3$ in the particle boundary phase is 75% or less (corresponding to the condition relating to (2.2) Area Percentage of α-$Al_2O_3$).

Condition (d): The average thickness Ta of the particle boundary phase is 10 nm or more and 300 nm or less (corresponding to the (2.3) Condition Relating to Thickness of Particle Boundary Phase 6).

In contrast, Experimental Examples 2-15 to 2-22, which are Comparative Examples, do not satisfy the conditions below.

Experimental Example 2-15 does not satisfy condition (a).

Experimental Example 2-16 does not satisfy condition (d).

Experimental Example 2-17 does not satisfy condition (c).

Experimental Example 2-18 does not satisfy condition (a) or (c).

Experimental Example 2-19 does not satisfy condition (a).

Experimental Example 2-20 does not satisfy condition (d).

Experimental Example 2-21 does not satisfy condition (c).

Experimental Example 2-22 does not satisfy condition (a), (c), or (d).

In Experimental Examples 2-1 to 2-14, which were Examples, hysteresis loss and eddy current loss were reduced in a balanced manner compared with Experimental Examples 2-15 to 2-22, which were Comparative Examples.

Among Experimental Examples 2-1 to 2-14, which were Examples, Experimental Examples 2-7 and 2-14, which further satisfied all conditions (h), (i), and (j) below, exhibited hysteresis loss and eddy current loss that were further reduced in a balanced manner.

Condition (h): The area percentage S(Al) is 85% or more and 100% or less.

Condition (i): $80 \leq A+B \leq 100$

Condition (j): $0 \leq C \leq 20$

Experimental Examples 2-1 to 2-6 and 2-8 to 2-13 do not satisfy the conditions below.

Experimental Example 2-1 does not satisfy condition (h), (i), or (j).

Experimental Example 2-2 does not satisfy condition (h), (i), or (j).

Experimental Example 2-3 does not satisfy condition (h), (i), or (j).

Experimental Example 2-4 does not satisfy condition (h), (i), or (j).

Experimental Example 2-5 does not satisfy condition (h).

Experimental Example 2-6 does not satisfy condition (i) or (j).

Experimental Example 2-8 does not satisfy condition (h), (i), or (j).

Experimental Example 2-9 does not satisfy condition (h), (i), or (j).

Experimental Example 2-10 does not satisfy condition (h), (i), or (j).

Experimental Example 2-11 does not satisfy condition (h), (i), or (j).

Experimental Example 2-12 does not satisfy condition (h).

Experimental Example 2-13 does not satisfy condition (i) or (j).

Advantageous Effects of Examples

The dust cores of Examples had both low hysteresis loss and low eddy current loss.

The present invention is not limited to the embodiments that have been described in detail above, and various modifications or changes can be made within the scope of the claims of the present invention.

Industrial Applicability

The dust core according to the present invention is particularly suitable for use in applications such as motor cores, transformers, choke coils, and noise absorbing components.

REFERENCE SIGNS LIST

1: dust core
3: soft magnetic metal particle
6: particle boundary phase
11: one side
13: opposing side
21: continuous layer
35: pore
C1: imaginary circle
C2: imaginary circle
LH: perpendicular bisector
O1: intersecting point
O2: intersecting point
S (S1 to S5): start point
E (E1 to E5): end point
Ta: average thickness
Tn: thickness
D1: region in which area percentage P of pores in third field of view is largest
D2: region in which area percentage P of pores in third field of view is smallest
PS1: press surface
PS2: press surface

What is claimed is:

1. A dust core comprising soft magnetic metal particles and a particle boundary phase, the soft magnetic metal particles having an average particle size of 5 μm or more and 30 μm or less, wherein the particle boundary phase includes a polycrystalline compound containing Al (aluminum), when a sectional structure of the dust core is observed, an area percentage of α-$Al_2O_3$ in the particle boundary phase is 75% or less, when the sectional structure of the dust core is observed in a first field of view of a 150 μm×150 μm square, and when, in a region where the particle boundary phase is located in an H-letter shape, two intersecting points where two vertical lines and one horizontal line that constitute the H letter intersect are connected with a straight line, and a perpendicular bisector of the straight line is drawn, a crossing width at a position where the perpendicular bisector crosses the particle boundary phase is defined as a thickness Tn of the particle boundary phase, and when the thickness of the particle boundary phase is measured at five positions to respectively determine Tn (where n is an integer of 1 to 5), and an average thickness Ta which is an average of Tn (where n is an integer of 1 to 5) is calculated, the average thickness Ta is 10 nm or more and 300 nm or less.

2. The dust core according to claim 1, wherein when a ratio of an amount of Al to an amount of oxygen in the particle boundary phase is measured, Al:O (molar ratio) is 2.0:2.5 to 2.0:2.9.

3. The dust core according to claim 1, wherein when the sectional structure of the dust core is observed in a second field of view of a 100 μm×100 μm square, the particle boundary phase is continuously formed from a start point at which the particle boundary phase is present on one side of the square defining the second field of view to a side opposing the one side of the square, and the dust core has five or more continuous layers that are different from each other, and an average length of paths of the continuous layers from the one side to the opposing side is 115 μm or more.

4. The dust core according to claim 1, wherein when the sectional structure of the dust core is observed in a third field of view of a 100 μm×100 μm square, and an area percentage P (%) of pores in the third field of view is determined, a difference between P1 and P2 is 3% or less, where P1 represents a maximum value of the area percentage P, and P2 represents a minimum value of the area percentage P.

5. The dust core according to claim 1, wherein when the sectional structure of the dust core is observed, an area percentage S(Al) of the polycrystalline compound containing Al (aluminum) in the particle boundary phase is 85% or more and 100% or less, and when, in the area percentage S(Al), an area percentage S(α) of α-$Al_2O_3$ is represented by A %, an area percentage S(γ) of γ-$Al_2O_3$ is represented by B %, and an area percentage S(o) of $Al_2O_3$ having another crystal structures is represented by C %, $80 \leq A+B \leq 100$ (where $0 \leq A \leq 40$, $40 \leq B \leq 100$) and $0 \leq C \leq 20$ $(A+B+C=100)$.

* * * * *